No. 865,418. PATENTED SEPT. 10, 1907.
G. MOE.
BACKGROUND FOR PHOTOGRAPHIC MEASUREMENTS.
APPLICATION FILED APR. 10, 1905.
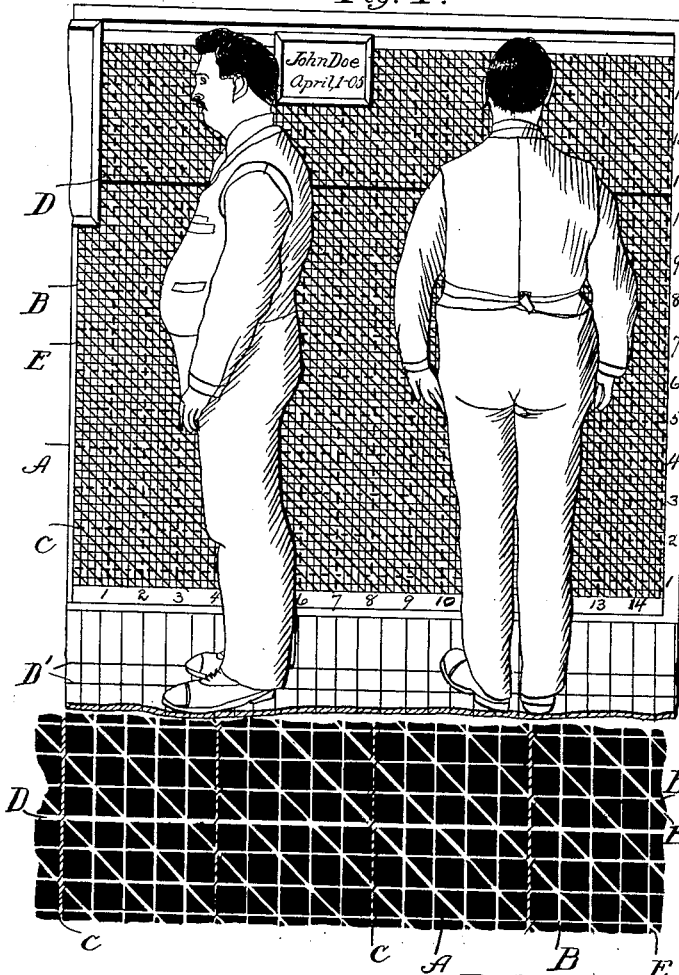
Fig. 1.
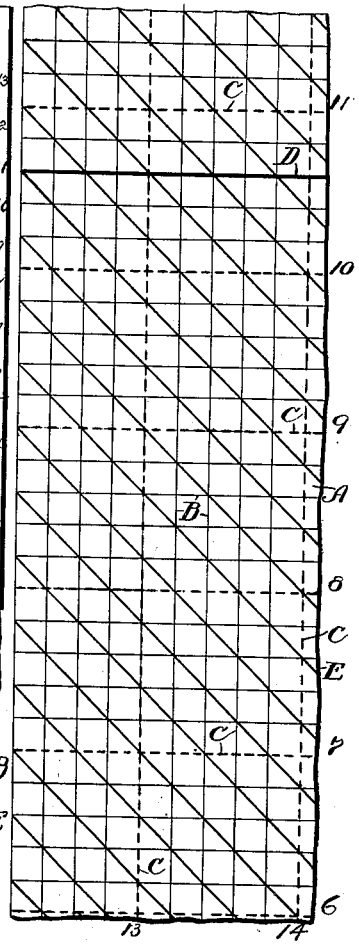
Fig. 2.
Fig. 3.
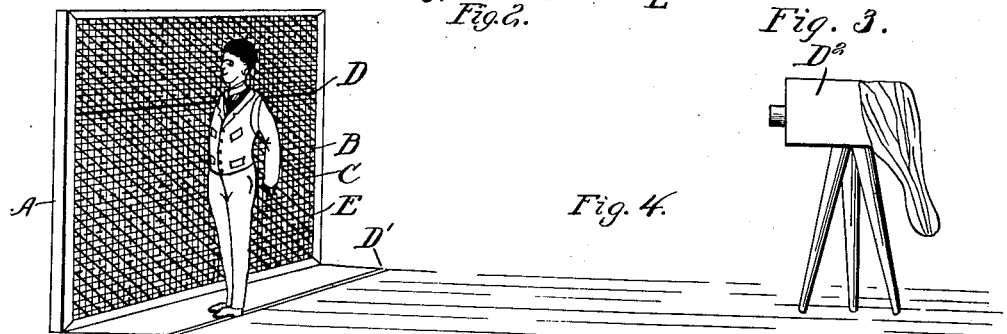
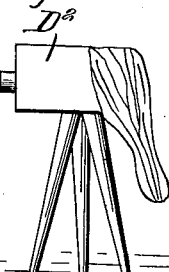
Fig. 4.
WITNESSES:
INVENTOR
Gerhard Moe,
By E. B. Stocking
Attorney

UNITED STATES PATENT OFFICE.

GERHARD MOE, OF LADYSMITH, WISCONSIN.

BACKGROUND FOR PHOTOGRAPHIC MEASUREMENTS.

No. 865,418.      Specification of Letters Patent.      Patented Sept. 10, 1907.

Application filed April 10, 1905. Serial No. 254,786.

*To all whom it may concern:*

Be it known that I, GERHARD MOE, a citizen of the United States, residing at Ladysmith, in the county of Gates, State of Wisconsin, have invented certain new and useful Improvements in Backgrounds for Photographic Measurements, of which the following is a specification, reference being had therein to the accompanying drawing.

This invention relates to a background for photographic measurements and is particularly adapted as an improvement upon the method and apparatus disclosed in my prior patent No. 689,361, dated December 17th, 1901.

The invention has for an object to provide a background having thereon lines of contrasting color so as to clearly define the outlines of the body in an ordinary artificial light so that a proper measurement and proportionate description and attitude of the body may be secured.

A further object of the invention is to provide means upon the background for indicating distances thereon and also for the proper alinement of the camera with which the negative for the measurement is taken.

Other and further objects and advantages of the invention will be hereinafter set forth and the novel features thereof defined by the appended claims.

In the drawing, Figure 1 is a perspective illustrating two positions of the person to be measured relative to the graduated background; Fig. 2, a detail elevation of the preferred background having a body of black or strong contrasting color to the lines thereon; Fig. 3, a similar view illustrating a white background with contrasting lines; and Fig. 4, a perspective showing the relative arrangement of the accessories in the use of the background.

Like letters of reference refer to like parts in the several figures of the drawing.

The letter A designates the background, which may be mounted in any suitable manner, and is disposed in a vertical plane directly behind the person to be measured. This ground may be of any desired color, preferably black, as indicated in Fig. 2, when using a strong light, or of a light color in a weak light and is provided with graduated lines B thereon of a contrasting color and extended at right angles to each other to produce a series of blocks or squares each of a predetermined diameter. The lines forming these blocks cut against the outline of the figure to be photographed, thus clearly defining all of the curves or angles of the figure and also indicating the relative distance between different points for the purpose of computing measurements therefrom for tailors, artists or model makers. It has also been found desirable to dispose at predetermined distances apart horizontally and vertically extending indicating lines C which may be of such character as to contrast with the other lines, and suitably marked with numerals, as shown in Fig. 3. In this illustration every fifth graduating line in each direction is distinguished from the remaining lines, forming a series of squares or blocks of greater diameter than those of smaller graduations and embracing a proper number of these smaller graduated blocks. It is also desirable in a device of this character that the lens of the camera should be disposed at the proper elevation, and for that purpose a horizontally extending line D traverses the entire background at a proper distance above the floor so that this line should extend centrally of the lens of the camera when the latter is properly adjusted. It has been found in practice that an elevation of the camera above the floor line to about the level of the shoulders is desirable to obtain the right perspective for coats or other garments, while for trousers or ladies skirts the camera may be disposed upon the waist or hip line. The person to be photographed should also stand at a proper distance in front of the background, and for this purpose indicating lines D' are shown as disposed upon the floor at any proper distance from the background, which in practice is found to be about eighteen inches. The person photographed when standing upon these lines will by this arrangement of the perspective angles give a clear cut measurement and accurate description of the body against the background from which the necessary proportionate and actual measurements can be read by the designer or cutter. For this purpose it is also desirable that the camera D² be located at a proper distance from the line D', which in practice is found to be about eight feet and eight inches. With the measurements thus obtained the circumference of the body can be readily secured by dividing the sum of the two diameters by 2 and multiplying by 3.1416. In order to obtain the proper angles to compute the actual diameters, the relative positions of the background, center of the body, and the camera must be known.

With the arrangement so far described a proper measurement and outline can be secured, but for the purpose of assisting in bringing out clearly the outline of the body at all points in contrast to the background I have found it desirable to apply thereto a series of diagonally disposed lines E which contrast in color to the background and intersect the squares or spaces hereinbefore described. The diagonal lines enable a clear outline to be obtained of any part of the body with an ordinary light, such as found in stores, and by intersecting the squares form a point of contact with the image of the object before the background, which is particularly important where definite measurements are necessary at close distances apart, for instance, in the curve or slope of the shoulders. It has also been found desirable to apply to the background a slate or other writing surface upon which the proper identifying data may be placed for the person to be measured, so that the negative when taken contains all of the data necessary for use by the designer or cutter in preparing the garment, while the photograph of the person to be fitted gives an accurate conception of the general build, carriage and stature of the customer, which is very important in the proper designing of garments when made upon order.

The invention in part is adapted to be used either with a screen superposed upon the photograph or negative obtained, as in my prior patent No. 689,361, or without such a screen, as shown in the present illustration. The use of this screen, however, does not sufficiently and clearly outline the figure to afford an accurate and reliable basis both for measurement and for obtaining the general characteristics of the person measured. With the use of a screen either in the camera or interposed between the lens thereof and the object photographed, a much more expensive lens and a very exact adjustment are required in order to overcome the distortion and obtain accurate and satisfactory results. With the use of the graduated background and the relative position of the object and the camera an ordinary cheap lens may be used so that an accurate image is obtained which can be used as a chart to indicate the correct measurements from which to lay out and cut a pattern for a garment. The invention, therefore, permits the practical use of an ordinary photographic instrument and greatly reduces the expense from this source.

An important feature of this invention consists in the thorough description of the peculiarities and proportionate measurement of the individual according to the bone structure, and while actual measurements are obtainable, still, the photographic measurement thus secured obtains the attitude, general description of individual peculiarity, and proportionate measurements according to the bone structure.

Having described my invention and set forth its merits what I claim and desire to secure by Letters Patent is:—

1. The combination with a graduated back ground for securing photographic outline measurements for tailoring purposes having upon its surface a series of intersecting lines disposed at predetermined distances apart and having indicating characters thereon, of a support in advance of said background provided with a positioning indication spaced at a predetermined distance from the background.

2. The combination with a background for securing photographic outline measurements having upon its surface a series of intersecting lines provided with indicating characters and a distinguishing horizontal line, and a camera having its lens disposed at the elevation of the horizontal line, of a positioning indication disposed upon a support in advance of said background and at a predetermined distance from the background and said camera.

In testimony whereof, I affix my signature in presence of two witnesses.

GERHARD MOE.

Witnesses:
THEODORE M. THOMAS,
JOHN T. CORGRIFF.